(12) United States Patent
Burton et al.

(10) Patent No.: US 6,917,182 B2
(45) Date of Patent: Jul. 12, 2005

(54) METHOD AND SYSTEM FOR PROVIDING INDUCTION CHARGING HAVING IMPROVED EFFICIENCY

(75) Inventors: Andrew F. Burton, Coral Springs, FL (US); Joseph Patino, Pembroke Pines, FL (US); Russell L. Simpson, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 33 days.

(21) Appl. No.: 10/626,333

(22) Filed: Jul. 24, 2003

(65) Prior Publication Data

US 2005/0017677 A1 Jan. 27, 2005

(51) Int. Cl.[7] .................................................. H02J 7/00
(52) U.S. Cl. ....................................................... 320/108
(58) Field of Search ................................ 320/108, 119, 320/139; 307/10.1; 323/258; 318/364, 701

(56) References Cited

U.S. PATENT DOCUMENTS

| | | | | |
|---|---|---|---|---|
| 3,938,020 A | * | 2/1976 | Bourke ........................ 320/139 |
| RE35,643 E | * | 10/1997 | Gali ........................... 320/119 |
| 5,786,684 A | * | 7/1998 | Bapat ......................... 323/258 |
| 5,889,384 A | | 3/1999 | Hayes et al. ................. 320/108 |
| 5,951,735 A | * | 9/1999 | Ruegenberg et al. ......... 65/377 |
| 5,969,511 A | * | 10/1999 | Asselman et al. ........... 323/258 |
| 6,016,046 A | | 1/2000 | Kaite et al. ................. 320/108 |
| 6,037,728 A | * | 3/2000 | Petkovic ..................... 318/364 |
| 6,040,680 A | | 3/2000 | Toya et al. .................. 320/108 |
| 6,184,651 B1 | | 2/2001 | Fernandez et al. .......... 320/108 |
| 6,208,115 B1 | * | 3/2001 | Binder ........................ 320/108 |
| 6,489,745 B1 | | 12/2002 | Koreis ........................ 320/108 |
| 6,693,403 B2 | * | 2/2004 | Chen .......................... 318/701 |
| 6,756,697 B2 | * | 6/2004 | Mizutani et al. ........... 307/10.1 |

* cited by examiner

*Primary Examiner*—Pia Tibbits
(74) *Attorney, Agent, or Firm*—Akerman Senterfitt

(57) ABSTRACT

A battery charging system (250) for use with an induction charger (210). The battery charging system can include a secondary coil (252) having a plurality of turns for receiving magnetic flux produced by a primary coil (220) of the induction charger, and a control circuit (254) for controlling a number of turns of the secondary coil that are used in generating an output voltage for charging a cell (264). For example, the secondary coil can include a plurality of taps (291, 292, 293, 294), each of the taps providing an electrical connection to the coil at a different point, and thus providing a variety of selectable output voltages.

21 Claims, 5 Drawing Sheets

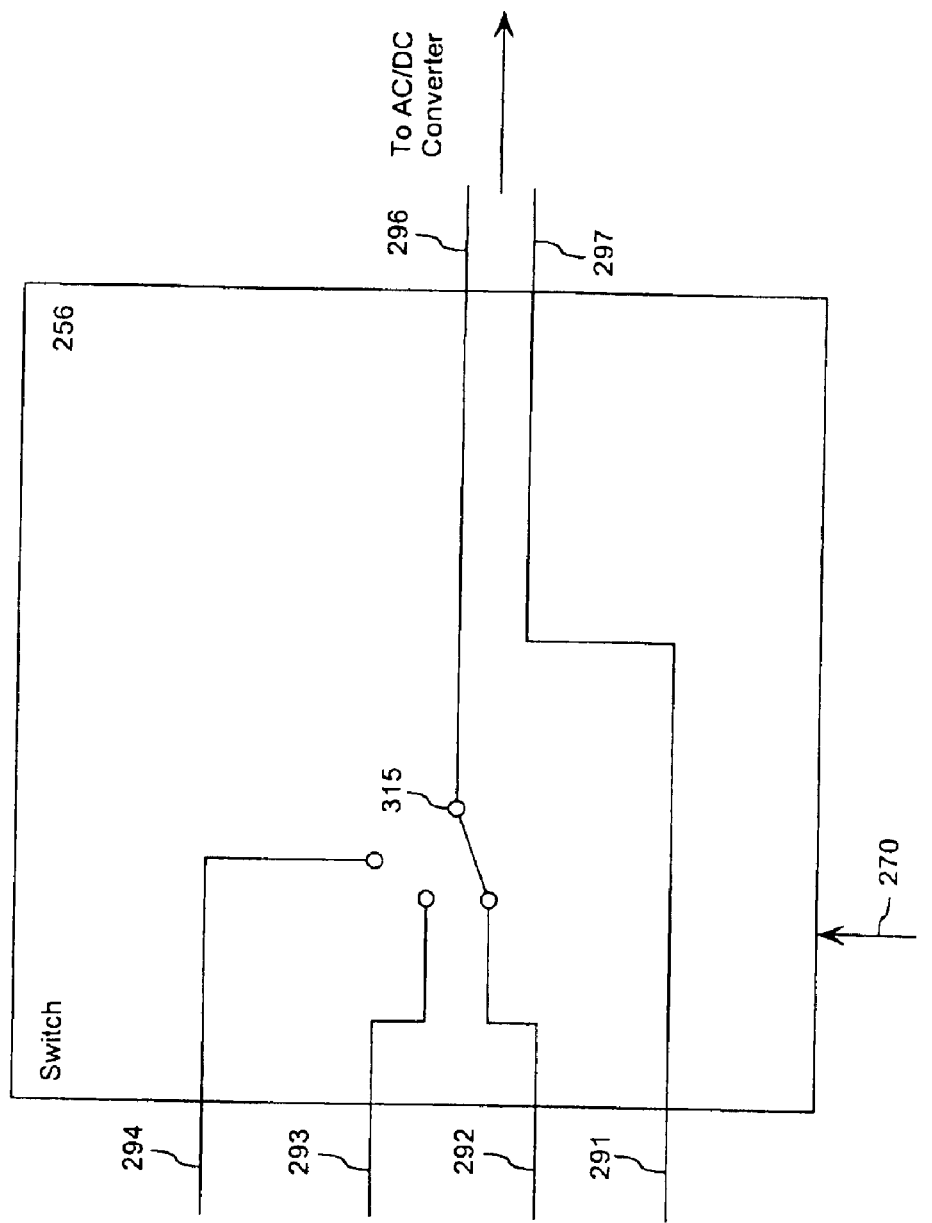

METHOD AND SYSTEM FOR PROVIDING INDUCTION CHARGING HAVING IMPROVED EFFICIENCY

CROSS-REFERENCE TO RELATED APPLICATIONS

Not applicable

FIELD OF THE INVENTION

The present invention relates to the field of charging systems, and more particularly to induction charging systems.

BACKGROUND OF THE INVENTION

Induction charging systems are well known in the field of portable electrical devices. For example, portable motorized toothbrushes typically contain a rechargeable battery which is charged by induction. Similarly, portable wireless communication devices, such as two-way RF radios, cellular phones, paging devices, and wireless communicators, commonly utilize a rechargeable battery that, in certain applications, is recharged by contactless induction charging. Such portable devices are becoming increasingly popular because of the convenience afforded a user by working without a wired connection, such as not having to connect plugs to sockets, not having to precisely locate and plug a unit to be charged, and the ability to quickly remove from a charger unit a device that has been recharged.

Unfortunately, present induction charging systems either have little control over input voltage to the charge control circuitry, or such systems employ wireless techniques to control these parameters by regulating the base of the charging system. Notably, implementation of wireless control techniques within the charging system is expensive. Moreover, regulating the base to control charge parameters oftentimes limits the charging system to efficient charging of only one device at a time. If such a base were to be used to charge two or more devices requiring different charge voltages, charge efficiency would suffer. For instance, the base may optimize the primary voltage for only one of the devices, such as the device requiring the highest charge voltage. Such a voltage level can damage the battery cell of a device requiring a lower charge voltage. A voltage drop network could be incorporated into the latter device in order to achieve the optimum charge voltage, but the energy dissipated by the voltage drop network would be wasted. More particularly, the energy would be transformed into heat, which can be harmful to battery cells, operation of the charging device, or operation of the battery operated device. Accordingly, what is needed is a relatively inexpensive induction charging system which provides the capability of simultaneously, and efficiently, charging multiple devices.

SUMMARY OF THE INVENTION

Embodiments in accordance with the present invention relate to a method and a system using a battery charging system and an induction charger. The battery charging system can include a secondary coil having a plurality of turns for receiving magnetic flux produced by a primary coil of the induction charger, and a control circuit for controlling a number of turns of the secondary coil that are used in charging a cell. The battery charging system can be contained in a battery operated device or within a battery. The cell can be detachable from the battery operated device.

The secondary coil can include a plurality of taps, each of the taps providing an electrical connection to the coil. A flow of time-varying electric current through the primary coil can generate a voltage potential between at least two of the taps. For instance, the secondary coil can receive magnetic flux and generate an output voltage responsive to the magnetic flux.

At least one switch can be provided which is responsive to a control signal generated by the control circuit. The switch can include at least one transistor, relay, or mechanical switch. The switch can be operable between a first position wherein a first voltage is applied from a first of the taps to the cell, and a second position wherein a second voltage is applied from a second of the taps to the cell. Accordingly, in response to at least one among a state of charge of the cell, a temperature of the cell, or a charge current, the control circuit can control the number of turns of the secondary coil that are used to generate the output voltage.

Embodiments in accordance with the present invention relate to an induction charging system. The induction charging system can include an induction charger having a primary coil and a power supply which supplies a time-varying electric current to the primary coil. The induction charging system also can include a first battery charging system for charging at least one cell. The charging system can further include a second battery which is charged by a second battery charging system having a secondary coil for receiving magnetic flux from the induction charger simultaneously with the charging of the first battery. The second battery can include the same elements described for the first battery.

In another embodiment, a method for charging a cell with an induction charger includes the steps of receiving with a secondary coil a magnetic flux produced by the induction charger. The secondary coil can have a plurality of turns. The method also can include the step of controlling a number of turns of the secondary coil that are used in charging the cell.

BRIEF DESCRIPTION OF THE DRAWINGS

FIG. 3B is an exemplary schematic diagram of an alternate switch for use in the induction charging system of FIG. 2.

DETAILED DESCRIPTION OF THE DRAWINGS

An embodiment of the present invention describes a battery charging system for use with an induction charger. The battery charging system can include a secondary coil. The secondary coil can receive flux produced by a primary coil of the induction charger and generate an secondary output voltage (secondary voltage). The battery charging system also can include a control circuit which receives the secondary voltage and controls charging of a battery cell. The control circuit can adjust a number of effective turns of the secondary coil to optimize the amount of secondary voltage received from the secondary coil. In particular, the secondary voltage can be adjusted to optimize charging efficiency at a desired cell charge voltage. Notably, the battery charging system of the present invention can be incorporated into any number of devices. Accordingly, a plurality of such devices can be simultaneously, and efficiently, charged using a single induction charger.

Figure 1:
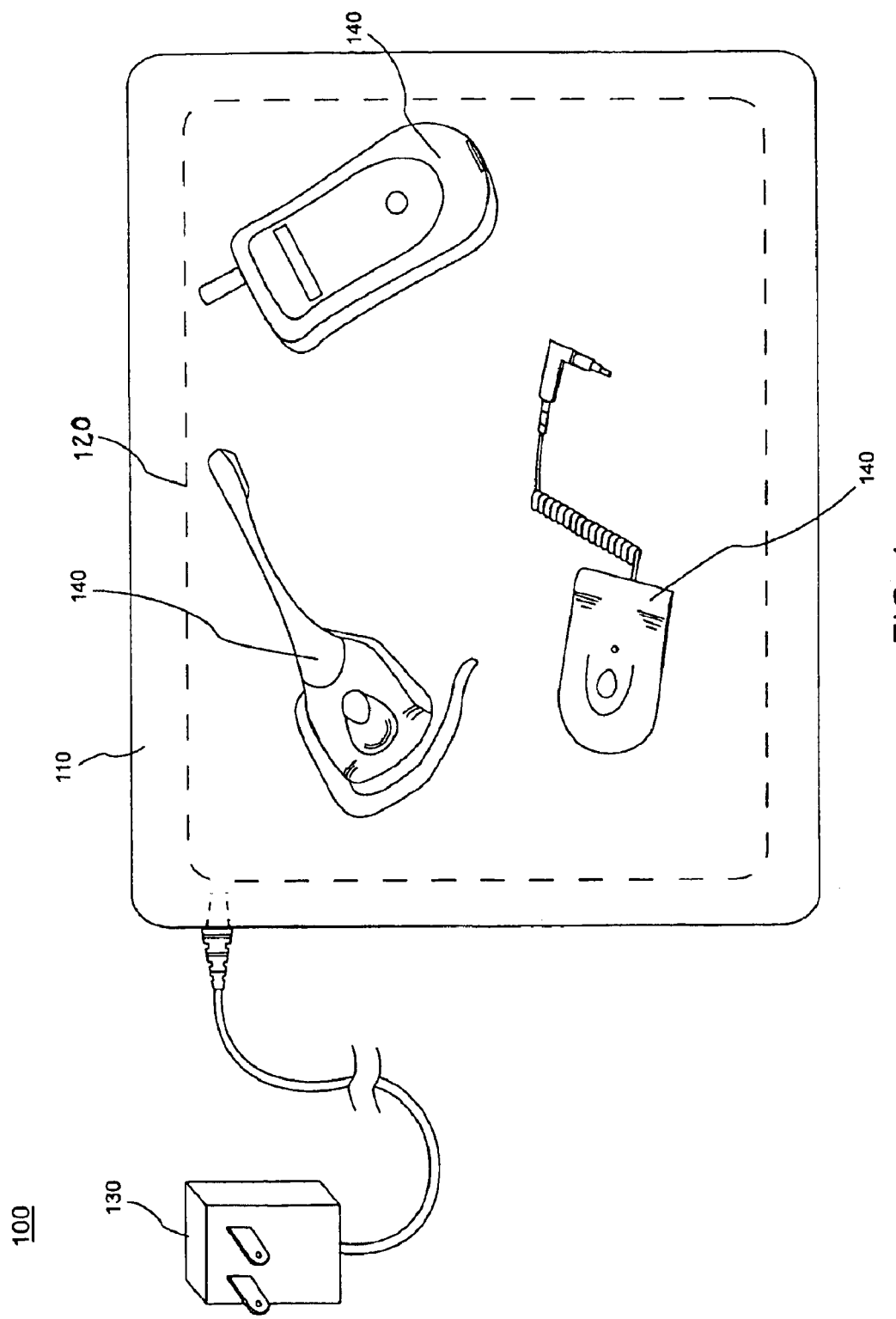
FIG. 1 is a top view of an exemplary induction charging system in accordance with the inventive arrangements disclosed herein.

Referring to FIG. 1, a top view is shown of an exemplary induction charger 100. The induction charger 100 can include an induction charger base (base) 110 having a primary coil 120. The base 110 can be provided in any arrangement compatible for use in an induction charging system. For example, the base 110 can be a substantially planar pad, as shown. The base also can be configured as a stand, a box, a bowl, a tub, or any other suitable shape. In yet another arrangement, the base can be provided with contours configured to receive specific battery operated devices.

In a preferred arrangement, the base 110 can comprise a dielectric material (e.g. rubber or plastic) and the primary coil 120 can be embedded within the dielectric material. Nonetheless, other base arrangements can be used. For instance, the primary coil 120 can be disposed above or below the base 110. Further, the base 110 can comprise other types of material. For example, the base can have one or more regions having ferromagnetic or paramagnetic materials disposed within the base to enhance or contour a magnetic field generated by the primary coil 120.

The primary coil 120 can include a conductive and/or semi-conductive material to facilitate a flow of electric current through the primary coil 120. Further, the primary coil 120 can be operatively connected to receive time-varying electric current from a power supply 130. For example, the electric current can be sinusoidal alternating current (A/C), pulsed current, or any other electric signal which causes the primary coil 120 to generate a time-varying magnetic field. In the preferred arrangement, the power supply 130 can be configured to mate with an electrical outlet.

In operation, one or more battery operated devices 140 can be proximately located to the base 110. For example, the battery operated devices 140 can be positioned on the base 110, as shown. The battery operated devices 140 also can be positioned over, under, or near the base 110 such that the magnetic field generated by the primary coil 120 couples to the devices 140.

Figure 2:
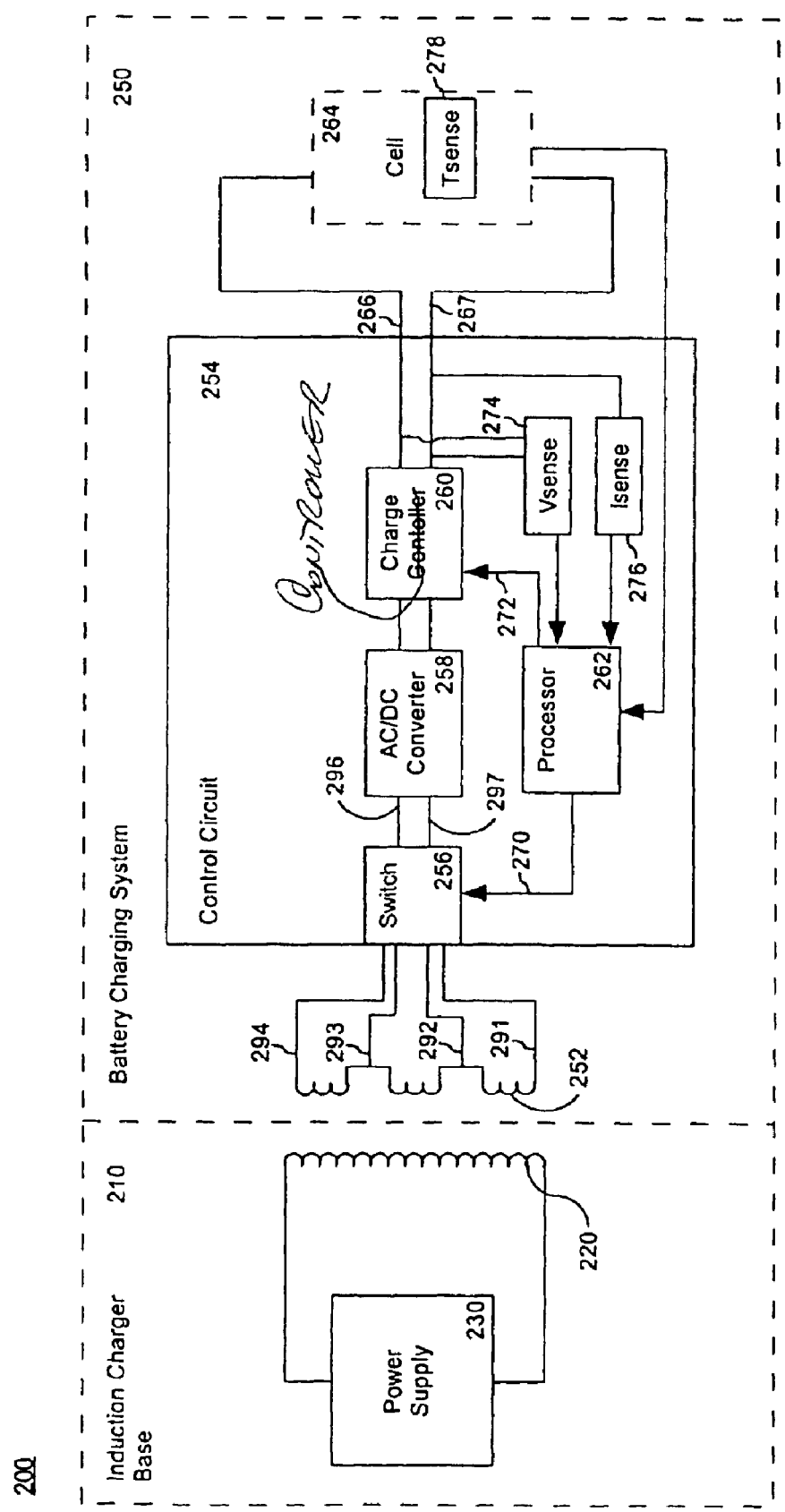
FIG. 2 is an exemplary schematic diagram of a induction charging system in accordance with the inventive arrangements disclosed herein.

Referring to FIG. 2, a schematic view of an exemplary induction charging system 200 is shown. As noted, the induction charging system includes an induction charger base 210 having a primary coil 220 and a power supply 230. The primary coil 220 can be electromagnetically coupled to a secondary coil 252 of a battery charging system 250. The battery charging system 250 can be used to charge a cell 264, for example a battery cell. In one arrangement, the battery charging system 250 can reside within a battery operated device and provide electrical outputs 266, 267 to supply energy to the cell 264, for example via electrical contacts. In an alternate arrangement, the battery charging system 250 (including the cell 264) can reside within the battery itself used to power a battery operated device. In either case, the battery can be a battery which is detachable from the battery operated device.

The cell 264 can be any energy storage device. For example, the cell can be made from any rechargeable cell technology including, but not limited to, nickel-cadmium, nickel-metal hydride, and lithium ion technologies. In another arrangement, the cell can be a capacitor. The cell 264 can be detachable from, or fixed to, the battery operated device.

The secondary coil 252 can include a plurality of turns. As defined herein, a turn is a single wind or convolution of a conductor or semi-conductor. Notably, a voltage induced in the secondary coil 252 due to the magnetic field generated by the primary coil 220 is proportional to the level of magnetic flux flowing through the secondary coil 252 and the number of turns in the secondary coil 252.

The secondary coil 252 further can include a plurality of taps 291, 292, 293, 294. The taps 291, 292, 293, 294 can provide direct electrical connections from a control circuit 254 to turns on the secondary coil. As shown, four taps are provided. Nonetheless, the invention is not so limited and any number of taps can be provided.

The taps 291, 292, 293, 294 of the secondary coil 252 can be electrically connected to a switch 256 within the control circuit 254. In turn, the switch 256 can selectively connect the taps 291, 292, 293, 294 to inputs 296, 297 of an alternating current to direct current (AC/DC) converter 258 in response to a control signal 270 received from a processor 262. For instance, the switch 256 can connect the AC/DC converter 258 to any combination of taps. Accordingly, a number of turns of the secondary coil 252 across which the AC/DC converter 258 is connected can be varied. In consequence, a voltage applied across the inputs 296, 297 of the AC/DC converter 258 can be adjustable.

Figure 3A:
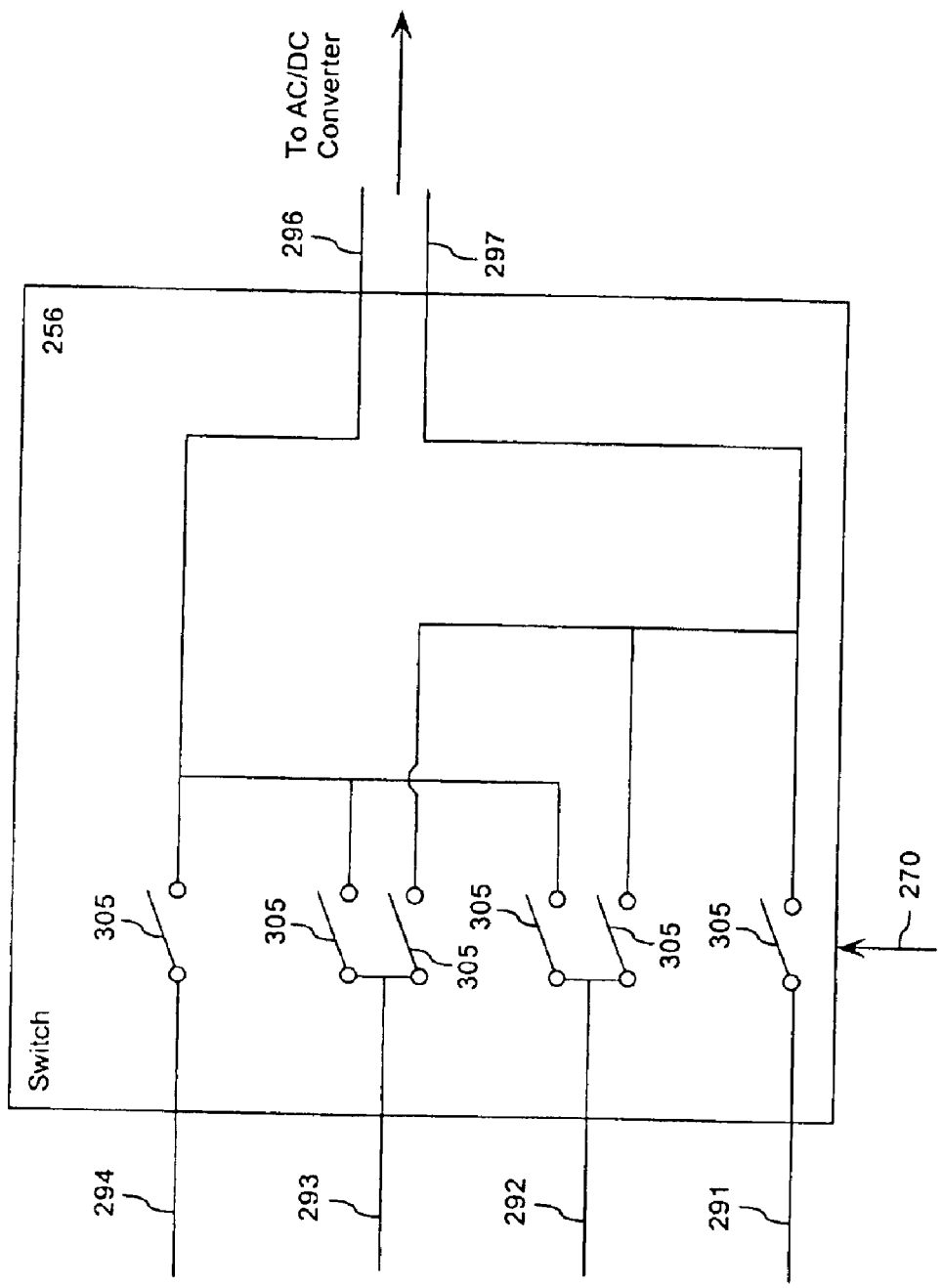
FIG. 3A is an exemplary schematic diagram of a switch for use in the induction charging system of FIG. 2.

Referring to FIG. 3A, a schematic view of an exemplary switch 256 is shown. The switch 256 can include one or more switching devices 305. The switching devices 305 can be any switching devices that can control current flow between two conductors. For example, the switching devices 305 can be transistors, relays, mechanical switches, or any other switch that can make or break an electrical connection between two conductors. The switching devices 305 can be selectively opened or closed in response to the control signal 270 to selectively establish an electrical connection between the taps 291, 292, 293, 294 and the AC/DC converter 258. For instance, the switching devices 305 can be selectively controlled to connect the inputs 296, 297 of the AC/DC converter 258 across the first tap 291 and any other tap, such as the second tap 292, the third tap 293 or the fourth tap 294. Alternatively, the switch 256 can connect the inputs 296, 297 of the AC/DC converter 258 across any other combination of taps, for example second tap 292 and third tap 293, second tap 292 and fourth tap 294, third tap 293 and fourth tap 294, and so on.

In an alternate arrangement, switching devices 305 also can be controlled to present a short circuit between taps. Caution should be exercised when designing such a circuit however, due to increased current that can flow in the turns electrically disposed between the shorted taps.

Referring to FIG. 3B, an alternate arrangement is shown wherein the switch 256 comprises a rotary switch 315. The rotary switch 315 can be any switching device which can electrically connect a conductor, such as the input 296 of the AC/DC converter, to any one of a plurality of taps. For example, the rotary switch 315 can be selectively controlled to connect the inputs 296, 297 of the AC/DC converter 258 across the first tap 291 and any other tap in response to the control signal 270. For instance, the rotary switch 315 can connect the first tap 291 to the second tap 292, the third tap 293 or the fourth tap 294.

Once again referring to FIG. 2, the AC/DC converter 258 can be provided to convert time-varying current received from the secondary coil 252, such as AC, into direct current (DC). The AC/DC converter can include a rectifier (not shown) and a ripple filter (not shown) to perform the AC to DC conversion, and/or any other components which can perform such a conversion. AC/DC converters are well known to those skilled in the art.

DC from the AC/DC converter 258 can be provided to a charge controller 260, which can supply the DC to charge the cell 264. The charge controller 260 can supply the DC at a desired voltage and/or at a desired current level. For instance, if the charge controller receives DC at 4.2 V from the AC/DC converter 258, but the desired charge voltage to be applied to the cell 264 is 4.0 V, the charge controller can step down the voltage from 4.2 V to 4.0 V, for example using a continuously variable voltage divider circuit. Moreover, the charge controller can adjust the charge voltage and/or charge current in response to a control signal 272 received from the processor 262, which can be an application specific integrated circuit (ASIC) or other processor. It should be noted, however, that the amount of power dissipated by the voltage divider circuit is proportional to the voltage drop raised to the second power ($V_{drop}^2$). Accordingly, the voltage applied to the charge controller 260 from the AC/DC converter 258 should not exceed the desired charge voltage by a large amount. For example, the voltage applied to the charge controller 260 should not exceed the desired charge voltage by more than 0.5 V.

The processor 262 can monitor charging conditions of the cell 264 and cause adjustments to be made within the control circuit 254. Further, a charge voltage sensor 274, a charge current sensor 276, and/or a cell temperature sensor 278 can be provided to provide charging data to the processor 262. Such sensors are known to the skilled artisan.

In operation, the processor 262 can make adjustments to the switch 256 and/or the charge controller 260 to adjust and/or maintain a desired charge voltage based upon data received from the sensors 274, 276, 278. For example, the processor can monitor the charge voltage and charge current applied to the cell 264. If the measured charge current is excessively high, for example higher than a predetermined amount, the processor 262 can cause the charge voltage to be reduced by a necessary amount required to achieve a desired charge current. For example, an algorithm can be supplied for use by the processor to determine an appropriate charge voltage and/or charge current based upon the measurements made by the sensors 274, 276, 278. Alternatively, a lookup table can be provided which can be used by the processor to determine the appropriate charge voltage and/or charge current.

To effectuate a change in charge voltage and/or charge current, the processor 262 can send the control signal 270 to the switch 256 to cause the number of active turns in the secondary coil 252 to be adjusted. For instance, if the charge voltage is too high, the switching device(s) within switch 256 can be signaled to connect the AC/DC converter 258 to taps which will effectively reduce the number of active turns in the secondary coil 252, thereby reducing the voltage applied to the charge controller 260. Alternatively, if the charge voltage is too low, the switching device(s) within the switch 256 can be signaled to connect the AC/DC converter 258 to taps which will effectively increase the number of active turns in the secondary coil 252, thereby increasing the voltage applied to the charge controller 260.

It is anticipated that there will be a finite number of taps 291, 292, 293, 294. Thus, the voltage increments available by adjusting the switch 256 will be finite. Nevertheless, the processor 262 can send the control signal 272 to the charge controller 260 to provide further voltage adjustment. Accordingly, large voltage adjustments should be achieved by selecting taps on the secondary coil 252 to provide a voltage to the charge controller 260 which is at, or slightly higher than, the desired charge voltage. The charge controller 260 then can provide the appropriate amount of voltage drop to further adjust the voltage to achieve the desired charge voltage. The amount of voltage drop provided by the charge controller 260 should be small to reduce power loss and maintain high charging efficiency.

Figure 4:
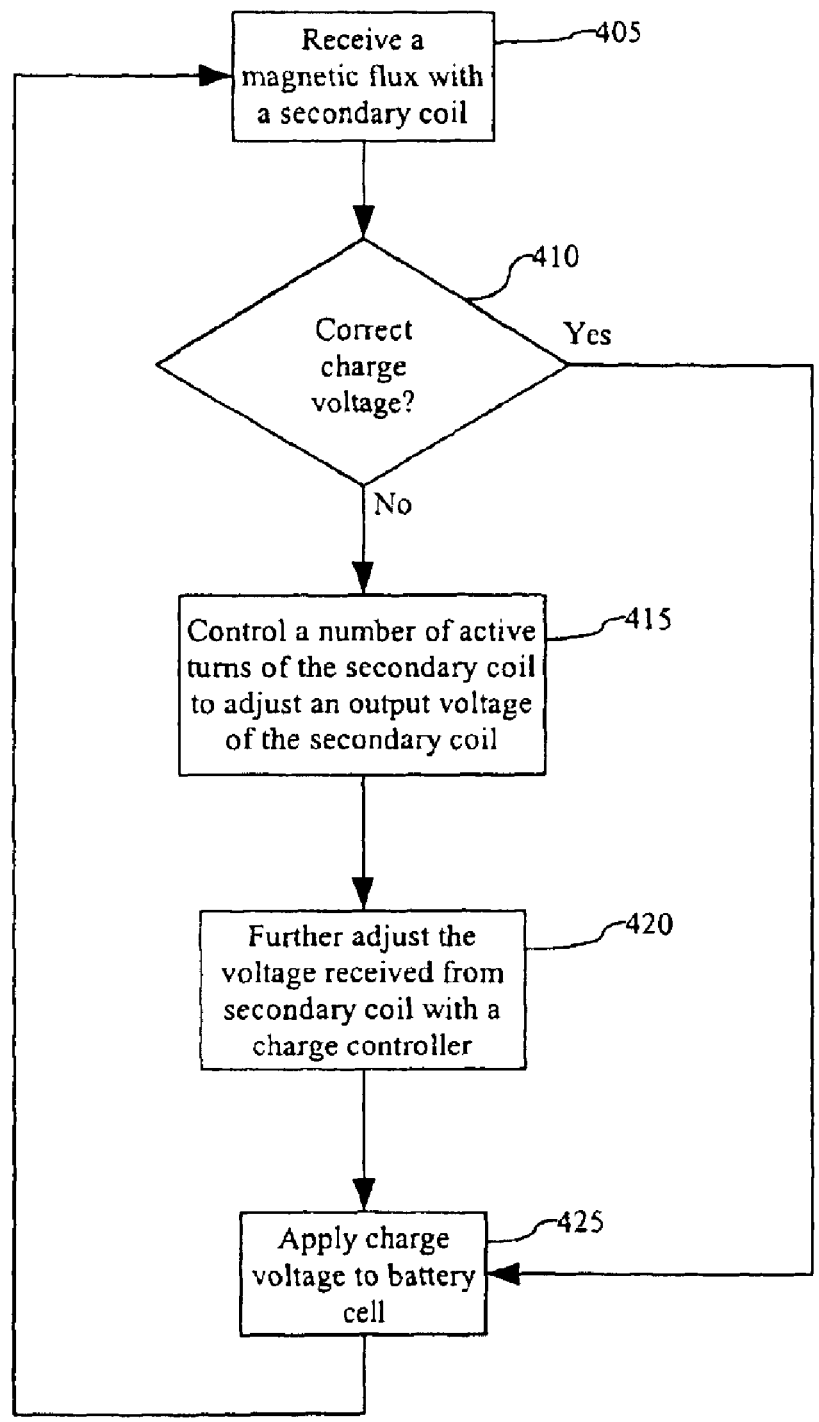
FIG. 4 is an exemplary flow chart illustrating a method of charging a battery with an induction charger in accordance with the present invention.

Referring to FIG. 4, a flow chart 400 is presented which illustrates a method for charging a battery with an induction charger in accordance with the present invention. Beginning with step 405, the secondary coil can receive magnetic flux produced by the primary coil. If the output voltage received from the secondary coil is the correct charge voltage for a battery cell, the output voltage can be applied to the cell as a charge voltage, as shown in decision box 410 and step 425. However, if the output voltage is not correct, the number of active turns of the secondary coil can be adjusted to generate an output voltage from the secondary coil having a value as near to, but preferably not less than, the desired charge voltage, as shown in step 415. Proceeding to step 420, the output voltage can be further adjusted by the charge controller to generate the desired charge voltage, and the charge voltage can be applied to the battery cell at step 425. Notably, the process can be a continuous process during a charge cycle with the output voltage being adjusted whenever necessary.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A battery charging system for use with an induction charger, comprising:

a plurality of secondary coils coupled to a corresponding plurality of cells for simultaneously receiving magnetic flux produced by a primary coil of the induction charger when said plurality of secondary coils is placed proximately to a base coupled to the induction charger, each of said plurality of secondary coils having a plurality of turns; and a corresponding control circuit coupled to each of said plurality of secondary coils for controlling a number of turns of each of said secondary coils for simultaneously charging the plurality of cells.

2. The battery charging system of claim 1, wherein said control circuit controls said number of turns responsive to at least one condition from the group consisting of a desired voltage to be applied to the corresponding cell of said secondary coil, a temperature of said at least one cell, and a charge current.

3. The battery charging system of claim 1, wherein each of said plurality of secondary coils further comprises a plurality of taps, each of said taps providing an electrical connection to said secondary coil.

4. The battery charging system of claim 3, wherein a flow of time-varying electric current through said primary coil generates a voltage potential between at least two of said plurality of taps.

5. The battery charging system of claim 4, further comprising at least one switch responsive to a control signal generated by said control circuit, said switch operable between a first position wherein a first voltage is applied from a first of said plurality of taps to said at least one cell, and a second position wherein a second voltage is applied from a second of said taps to said at least one cell.

6. The battery charging system of claim 5, wherein said switch comprises at least one device selected from the group consisting of a transistor, a relay, and a mechanical switch.

7. The battery charging system of claim 1, wherein each secondary coil and corresponding control circuit and corresponding cell are contained within a battery.

8. The battery charging system of claim 1, wherein each secondary coil and corresponding control circuit and corresponding cell are contained within a battery operated device.

9. The battery charging system of claim 8, wherein said corresponding cell is detachable from said battery operated device.

10. An induction charging system, comprising:
(a) an induction charger, comprising:
   a base for charging;
   a primary coil coupled to said base; and
   a power supply which supplies a time-varying electric current to said primary coil; and
(b) a plurality of battery operated devices each carrying at least one cell, wherein each of the battery operated devices includes a battery charging system for simultaneously charging the at least one cell when the plurality of battery operated devices is placed proximately to said base, said battery charging system comprising:
   a secondary coil for receiving magnetic flux produced by said primary coil of said induction charger, said secondary coil having a plurality of turns and generating an output voltage responsive to said received magnetic flux; and
   a control circuit for controlling a number of turns of said secondary coil to adjust the output voltage according to a desired voltage to be applied to said at least one cell.

11. The induction charging system of claim 10, wherein the base is substantially flat.

12. The charging system of claim 10, wherein said control circuit further controls said number of turns responsive to at least one condition from the group consisting of a temperature of said at least one cell and a charge current.

13. A method for simultaneously charging a plurality of cells each coupled to a corresponding plurality of secondary coils, comprising the steps of:
   placing the plurality of secondary coils and corresponding plurality of cells proximately to a base of an induction charger;
   receiving at the plurality of secondary coils a magnetic flux produced by the induction charger, each of said plurality of secondary coils having a plurality of turns that are used in charging the corresponding plurality of cells; and
   controlling a number of turns for each of said plurality of secondary coils to generate a desired voltage to be applied to the corresponding cell of said secondary coil.

14. The method of claim 13, wherein said controlling a number of turns step is further responsive to at least one condition from the group consisting of a temperature of said cell, and a charge current.

15. The method of claim 13, further comprising the step of providing a plurality of taps on said secondary coil, each of said taps providing an electrical connection to said secondary coil.

16. The method of claim 15, further comprising the step of supplying a flow of time-varying electric current through a primary coil of said induction charger to generate a voltage potential between at least two of said plurality of taps.

17. The method of claim 16, further comprising the steps of:
   providing at least one switch responsive to a control signal generated by a control circuit; and
   signaling said switch to transition between a first position wherein a first voltage is applied from a first of said taps to the corresponding cell coupled to said secondary coil, and a second position wherein a second voltage is applied from a second of said taps to said cell.

18. The method of claim 17, wherein said switch comprises at least one device selected from the group consisting of a transistor, a relay, and a mechanical switch.

19. A method for simultaneously charging a plurality of cells each coupled to a corresponding plurality of secondary coils, comprising the steps of:
   placing the plurality of secondary coils and corresponding plurality of cells proximately to a base of an induction charger;
   supplying a magnetic flux from said base for charging the plurality of cells;
   receiving said magnetic flux at the plurality of secondary coils;
   selectively controlling the number of turns of said plurality of secondary coils in response at least in part to a desired voltage to be applied to said plurality of cells; and
   generating an output voltage at each of the plurality of secondary coils in response to said received magnetic flux and selectively controlled number of turns of each of said plurality of secondary coils.

20. The method of claim 19, wherein said number of turns step is further responsive to at least one condition from the group consisting of a temperature of said at least one cell, and a charge current.

21. The method of claim 19, wherein the supplying step the magnetic flux is provided by the base having a substantially flat surface.

* * * * *